United States Patent
Miyazaki

(10) Patent No.: US 8,404,766 B2
(45) Date of Patent: Mar. 26, 2013

(54) RUBBER COMPOSITION FOR TREAD AND TIRE HAVING TREAD COMPRISING THE RUBBER COMPOSITION

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 299 days.

(21) Appl. No.: 12/668,792

(22) PCT Filed: Aug. 27, 2008

(86) PCT No.: PCT/JP2008/065282
§ 371 (c)(1),
(2), (4) Date: Jan. 12, 2010

(87) PCT Pub. No.: WO2009/050944
PCT Pub. Date: Apr. 23, 2009

(65) Prior Publication Data
US 2010/0204372 A1     Aug. 12, 2010

(30) Foreign Application Priority Data

Oct. 17, 2007  (JP) .................. 2007-270573
Aug. 8, 2008   (JP) .................. 2008-206251

(51) Int. Cl.
*C08K 5/36* (2006.01)
(52) U.S. Cl. ............ 524/331; 524/262; 524/333
(58) Field of Classification Search ........ 524/331, 524/333, 262
See application file for complete search history.

(56) References Cited

U.S. PATENT DOCUMENTS

| 2004/0254301 | A1 | 12/2004 | Tsukimawashi et al. |
| 2006/0155026 | A1 | 7/2006 | Aubert |
| 2009/0281223 | A1 | 11/2009 | Aubert |
| 2011/0021661 | A1 | 1/2011 | Aubert |

FOREIGN PATENT DOCUMENTS

| CN | 1125458 A | 6/1996 |
| CN | 1578790 A | 2/2005 |
| CN | 1836000 A | 9/2006 |
| DE | 695 09 525 T2 | 10/1999 |
| DE | 60 2004 011 935 T2 | 3/2009 |
| JP | 4-345641 A | 12/1992 |
| JP | 5-50538 B2 | 7/1993 |
| JP | 8-511050 A | 11/1996 |
| JP | 10-501291 A | 2/1998 |
| JP | 2002-173556 A | 6/2002 |
| JP | 2005-105007 A | 4/2005 |
| JP | 2006-527781 A | 12/2006 |
| JP | 2007-302865 A | 11/2007 |
| WO | WO-94/29380 A1 | 12/1994 |
| WO | WO-95/34601 A1 | 12/1995 |
| WO | WO-2005/007738 A1 | 1/2005 |

*Primary Examiner* — Peter D Mulcahy
(74) *Attorney, Agent, or Firm* — Birch, Stewart, Kolasch & Birch, LLP

(57) ABSTRACT

An object of the present invention is to satisfy both of the low heat build-up property and strength at break. The present invention provides a rubber composition for tread comprising 0.5 to 10 parts by mass of (B) an alkylphenol-sulfur chloride condensate indicated by the formula (B1):

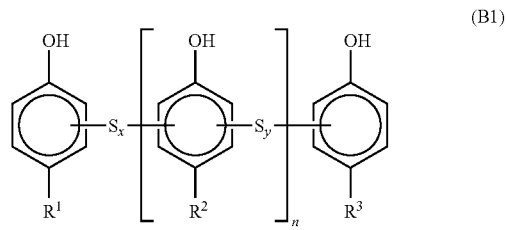

(wherein $R^1$ to $R^3$ are same or different, either is an alkyl group having 5 to 12 carbons; x and y are same or different, and either is an integer of 2 to 4; n is an integer of 0 to 10), 0.5 to 6 parts by mass of (C) sulfur, and 10 to 100 parts by mass of (D) silica, based on 100 parts by mass of the specific (A) rubber component comprising, and a tire having tread using thereof.

5 Claims, No Drawings

RUBBER COMPOSITION FOR TREAD AND TIRE HAVING TREAD COMPRISING THE RUBBER COMPOSITION

TECHNICAL FIELD

The present invention relates to a rubber composition for tread and a tire having tread comprising thereof.

BACKGROUND ART

The low fuel cost of a car has been conventionally carried out by reducing the rolling resistance of a tire (the improvement of rolling resistance). Request for the low fuel cost of a car has been recently strengthened and excellent low heat build-up property is requested for a rubber composition for producing tread, the ratio of tread occupied in a tire among tire members is high.

As methods of reducing the rolling resistance of tire tread, there are exemplified a method of compounding the specific amounts of 2 kinds of silica having different nitrogen adsorption specific surface areas (for example, Japanese Unexamined Patent Publication No. 2006-233177) and a method of compounding a modified styrene-butadiene rubber as a rubber component (for example, Japanese Unexamined Patent Publication No. 2006-56979).

Further, it is also known that heat build-up property is suppressed by increasing the compounding amount of sulfur. However, since strength at break TB and elongation at break EB of a rubber is lowered when the compounding amount of sulfur is increased, therefore there have been problems that tread crack is generated and the life time of tire tread is shortened when an obtained rubber composition is used for tire tread.

In other words, strength at break and low heat build-up property is contradictory physical property and it was difficult to satisfy both physical properties.

DISCLOSURE OF INVENTION

Problems Solved by the Invention

It is an object of the present invention to provide a rubber composition for tread satisfying both of the low heat build-up property and strength at break, and a tire having tread using thereof.

Means for Solving Problems

The present invention relates to a rubber composition for tread comprising
0.5 to 10 parts by mass of (B) an alkylphenol-sulfur chloride condensate indicated by the formula (B1):

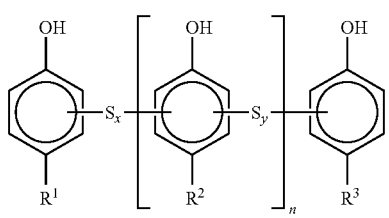

(wherein $R^1$ to $R^3$ are same or different, either is an alkyl group having 5 to 12 carbons; x and y are same or different, and either is an integer of 2 to 4; n is an integer of 0 to 10),
0.5 to 6 parts by mass of (C) sulfur, and
10 to 100 parts by mass of (D) silica,
based on 100 parts by mass of (A) a rubber component comprising 20 to 80% by mass of a modified styrene-butadiene rubber and/or a butadiene rubber having an ethoxysilyl group at terminal and 20 to 80% by mass of at least one diene rubber selected from a group including a natural rubber, an isoprene rubber, a butadiene rubber, a modified butadiene rubber other than a butadiene rubber having an ethoxysilyl group and a polybutadiene rubber including 1,2-syndiotactic crystals.

It is preferable that the rubber composition further comprises 2 to 50 parts by mass of (E) carbon black based on 100 parts by mass of the rubber component (A).

It is preferable that the rubber composition further comprises 0.1 to 5 parts by mass of (F) a citraconic imide compound based on 100 parts by mass of the rubber component (A).

Further, the present invention relates to a tire having tread comprising the rubber composition for tread.

BEST MODE FOR CARRYING OUT THE INVENTION

The rubber composition of the present invention comprises a rubber component (A), an alkylphenol-sulfur chloride condensate (B), sulfur (C) and silica (D).

The rubber component (A) comprises 20 to 80% by mass of a modified styrene-butadiene rubber (modified SBR) and/or a butadiene rubber having an ethoxysilyl group at terminal and 20 to 80% by mass of at least one rubber selected from a group including a natural rubber (NR), an isoprene rubber (IR), a butadiene rubber (BR), a modified butadiene rubber (modified BR) other than a butadiene rubber having an ethoxysilyl group and a polybutadiene rubber including 1,2-syndiotactic crystals (SPB-including BR).

The modified SBR includes a modified SBR by emulsion polymerization (modified E-SBR) and a modified SBR by solution polymerization (modified S-SBR). The modified S-SBR is preferable because the molecular weight of polymer is easily controlled, low molecular weight component, which increases tan δ, can be lessened, bond between silica and polymer chain can be strengthened and low fuel cost can be improved by reducing tan δ at 30 to 60° C. The amount of bonded styrene of the modified SBR is preferably at least 5% by mass and more preferably at least 7% by mass in the view point that reversion property at rubber compounding and grip property is superior. Further, the amount of bonded styrene of the modified SBR is preferably at most 30% by mass and more preferably at most 20% by mass in the view point that low heat build-up property is superior.

As the modified SBR, those having little amount of bonded styrene such as HPR 340 manufactured by JSR Corporation are preferable.

As the modified SBR, those coupled with tin and silicon are preferably used. As the coupling process of the modified SBR, for example, there is exemplified a process of reacting alkali metal (such as Li) and alkali earth metal (such as Mg) at the molecular chain terminal of the modified SBR with tin halide and silicon halide.

The modified SBR is a (co)polymer obtained by (co)polymerizing a conjugated diolefin alone or a conjugated diolefin with an aromatic vinyl compound. The modified SBR has preferably a primary amino group and an alkoxysilyl group.

The primary amino group may be bonded with either of a terminal at polymerization initiation, a terminal at polymerization termination, a polymer main chain and a side chain. But the primary amino group is preferably introduced in a terminal at polymerization initiation or a terminal at polymerization termination in the view point that energy loss from a polymer terminal is suppressed and hysteresis loss property can be improved.

The weight average molecular weight (Mw) of the modified SBR is preferably at least one million and more preferably at least 1.2 million in the view point that adequate fracture property is obtained. Further, the Mw of the modified SBR is preferably at most 2 million and more preferably at most 1.8 million in the view point that the viscosity of a rubber can be adjusted and kneading process can be easily carried out.

The butadiene rubber (BR) having an ethoxysilyl group at a terminal is preferably those obtained by introducing a functional group into BR obtained by solution polymerization because molecular weight distribution is easily controlled, a low molecular weight component being a factor for deteriorating rolling resistance can be removed and a functional group can be easily introduced at a terminal because of living polymerization. In the present invention, the butadiene rubber having an ethoxysilyl group at a terminal is also referred to as a butadiene rubber modified with ethoxysilane (S-modified BR).

The modification rate of the ethoxysilyl group of the BR having an ethoxysilyl group at a terminal is preferably at least 30% and more preferably at least 50% in the view point that boning quantity with silica is much and rolling resistance can be adequately reduced. Further, the modification rate of the ethoxysilyl group of the BR having an ethoxysilyl group at a terminal is preferably at most 80% and more preferably at most 70% in the view point that interaction effect with silica is adequately obtained and processability at kneading a rubber is not lowered.

As the molecular weight distribution (Mw/Mn) of the BR having an ethoxysilyl group at a terminal, those with narrow molecular weight distribution are preferable in the view point that a low molecular weight component is not increased and the rolling resistance is not deteriorated. Specifically, it is preferably at most 2.3 and more preferably at most 2.2. Further, the lower limit of molecular weight distribution is not specifically limited, but 1 is preferable.

The butadiene rubber (BR) having an ethoxysilyl group at a terminal is BR modified with a compound represented by the formula (1):

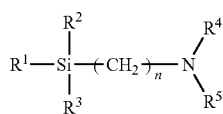
(1)

(wherein $R^1$, $R^2$ and $R^3$ are same or different and are an alkyl group, an alkoxy group, an acetal group, a carboxyl group, a mecrapto group or derivatives thereof. $R^4$ and $R^5$ are same or different and are an alkyl group or a hydrogen atom, and n is an integer).

The BR modified with a compound represented by the formula (1):

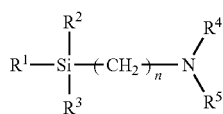
(1)

is preferable, in the view point that bonding property with silica can be improved and in the view point that the dispersibility of silica can be improved when silica is compounded as a filler.

As the specific example of the formula (1), for example, the formula:

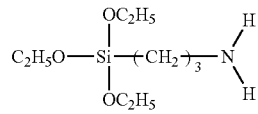

is exemplified.

Vinyl bonding quantity in the BR modified with the compound represented by the formula (1) is preferably at most 35% by mass, more preferably at most 30% by mass and further preferably at most 25% by mass in the view point that rim chafing property is superior. Further, vinyl bonding quantity in the BR modified with the compound represented by the formula (1) is preferably at least 5% by mass, more preferably at least 7% by mass and further preferably at least 10% by mass in the view point that production efficiency is superior.

The content of the modified SBR and/or BR having an ethoxysilyl group at a terminal in the rubber component (A) is at least 20% by mass, preferably at least 30% by mass and more preferably at least 40% by mass in the view point that grip property such as braking performance and steering response is superior. Further, the content of the modified SBR in the rubber component (A) is at most 80% by mass and preferably at most 70% by mass in the view point that other rubber components such as NR and BR are used in combination and heat build-up property is suppressed.

NR is not specifically limited, those usually used in the rubber industry can be used and RSS#3 and TSR20 are specifically exemplified. Further, IR is not also specifically limited and those conventionally used in the tire industry can be used.

The content of NR and/or IR in the rubber component (A) is at least 20% by mass and preferably at least 30% by mass in the view point that strength at break and low heat build-up property is superior. Further, the content of NR and/or IR in the rubber component (A) is at most 80% by mass, preferably at most 70% by mass and more preferably at most 60% by mass in the view point that SBR superior in grip performance and steering stability is adequately compounded.

BR is also not specifically limited and BR with high cis content (high cis BR) such as BR130B and BR150B manufactured by Ube Industries can be preferably used.

The content of BR in the rubber component (A) is at least 20% by mass and preferably at least 30% by mass in the view point that abrasion resistance and low heat build-up property is superior. Further, the content of BR in the rubber component (A) is at most 80% by mass, preferably at most 70% by mass and preferably at most 50% by mass in the view point that SBR superior in grip performance and steering stability is adequately compounded.

As the modified BR other than the BR having an ethoxysilyl group at terminal, there are preferable those that are obtained by polymerizing 1,3-butadiene by a lithium initiator and then adding a tin compound and in which the terminal of the modified BR molecule is bonded with a tin-carbon bond.

The lithium initiator includes lithium compounds such as an alkyl lithium, aryl lithium, vinyl lithium, organic tin lithium and organic nitrogen lithium compound, and lithium metal. The modified BR with high vinyl content and low cis content can be prepared by using the above lithium initiator as the initiator of the modified BR.

The tin compound includes tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin di-stearate, tetra-allyltin and p-tributyltin styrene. These tin compounds may be used alone and at least 2 kinds may be used in combination.

The content of a tin atom in the modified BR is preferably at least 50 ppm and more preferably at least 60 ppm. When the content of a tin atom is less than 50 ppm, effect for promoting the dispersion of carbon black in the modified BR is little and tan δ tends to be increased when carbon black is compounded. Further, the content of a tin atom is preferably at most 3000 ppm, more preferably at most 2500 ppm and further preferably at most 250 ppm. When the content of a tin atom exceeds 3000 ppm, the cohesiveness of a kneaded article is inferior and edges are not arranged; therefore the extrusion property of the kneaded article tends to be deteriorated.

The molecular weight distribution (Mw/Mn) of the modified BR is preferably at most 2 and more preferably at most 1.5. When Mw/Mn of the modified BR exceeds 2, the dispersibility of carbon black is deteriorated and tan δ tends to be increased when carbon black is compounded.

The vinyl bond quantity in the modified BR is preferably at least 5% by mass and more preferably at least 7% by mass. When the vinyl bond quantity of the modified BR is less than 5% by mass, it tends to be difficult to polymerize (produce) the modified BR. Further, the vinyl bond quantity of the modified BR is preferably at most 50% by mass and more preferably at most 20% by mass. When the vinyl bond quantity of the modified BR exceeds 50% by mass, tensile strength is lowered and when carbon black is compounded, the dispersibility of carbon black tends to be deteriorated.

The content of the modified BR in the rubber component (A) is at least 20% by mass and preferably at least 30% by mass in the view point that low heat build-up property is superior. Further, the content of the modified BR in the rubber component (A) is at most 80% by mass, preferably at most 70% by mass and more preferably at most 50% by mass in the view point that SBR superior in grip performance and steering stability is adequately compounded.

In the SPB-including BR, 1,2-syndiotactic polybutadiene crystals (SPB) are not those in which crystals are merely dispersed in BR but preferably those in which they are chemically bonded with BR to be dispersed. Since the crystals are chemically bonded with the rubber component to be dispersed, the generation and propagation of crack tends to be suppressed. Further, the SPB-including BR is not specifically limited, but can be produced by, for example, a process described in Japanese Unexamined Patent Publication No. 11-349732.

The melting point of SPB is preferably at least 180° C. and more preferably at least 190° C. in the view point that crystals are not melted during the vulcanization of a tire by press and adequate hardness is obtained. Further, the melting point of SPB is preferably at most 220° C. and more preferably at most 210° C. in the view point that the molecular weight of the SPB-including BR is small and dispersibility is superior in the rubber composition.

The content of SPB in the SPB-including BR is preferably at least 2.5% by mass and more preferably at least 10% by mass in the view point that adequate hardness is obtained. Further, the content of SPB is preferably at most 20% by mass and more preferably at most 18% by mass in the view point that adequate fluidity in a container for polymer production is obtained, production efficiency is superior and the dispersibility of SPB is superior.

The content of the SPB-including BR in the rubber component (A) is at least 20% by mass and preferably at least 30% by mass in the view point that abrasion resistance and low heat build-up property is superior. Further, the content of the SPB-including BR in the rubber component (A) is at most 80% by mass, preferably at most 70% by mass and more preferably at most 50% by mass in the view point that SBR superior in grip performance and steering stability is adequately compounded.

The alkylphenol-sulfur chloride condensate (B) is a compound indicated by the formula (B1):

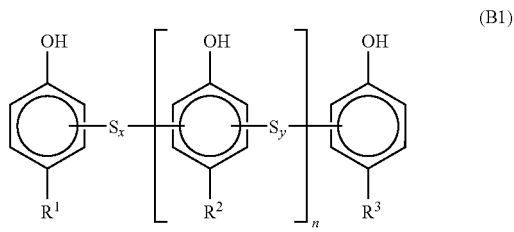

(B1)

(wherein $R^1$ to $R^3$ are same or different, either is an alkyl group having 5 to 12 carbons; x and y are same or different, and either is an integer of 2 to 4; and n is an integer of 0 to 10).

Since the alkylphenol-sulfur chloride condensate (B) represented by the formula (B1) has no polarity in aromatic rings, it can be dispersed well in the modified SBR in the rubber component (A).

n is an integer of 0 to 10 and preferably an integer of 1 to 9 in the view point that the dispersibility of the alkylphenol-sulfur chloride condensate (B) in the rubber component (A) is good.

x and y are same or different, and either is an integer of 2 to 4 and both are preferably 2 in the view point that the rubber composition can be efficiently hardened highly (the suppression of reversion).

$R^1$ to $R^3$ are same or different and either is an alkyl group having 5 to 12 carbons and preferably an alkyl group having 6 to 9 carbons in the view point that the dispersibility of the alkylphenol-sulfur chloride condensate (B) in the rubber composition (A) is good.

The alkylphenol-sulfur chloride condensate (B) can be prepared by known methods and its method is not specifically limited, but for example, a method of reacting alkylphenol with sulfur chloride at a ratio of 1:0.9 to 1.25 is exemplified.

As the specific example of the alkylphenol-sulfur chloride condensate (B), there is exemplified TACKROL V200 available from Taoka Chemical Co., Ltd. in which n is 0 to 10, x and y are 2, R is $C_8H_{17}$ (octyl group) and the content of sulfur is 24% by mass:

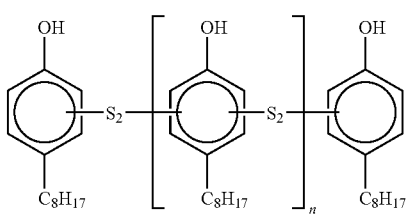

(wherein n is an integer of 0 to 10).

The compounding amount of the alkylphenol-sulfur chloride condensate (B) is at least 0.5 part by mass based on 100 parts by mass of the rubber component (A) and preferably at least 1.0 part by mass. When the compounding amount of the alkylphenol-sulfur chloride condensate (B) is less than 0.5 part by mass, effect of reducing tan δ is little. Further, the compounding amount of the alkylphenol-sulfur chloride condensate (B) is at most 10 parts by mass based on 100 parts by mass of the rubber component (A) and preferably at most 7 parts by mass. When the compounding amount of the alkylphenol-sulfur chloride condensate (B) exceeds 10 parts by mass, scorch is easily generated during the process of rubber and effect of reducing tan δ is also saturated.

Sulfur (C) used in the present invention is not specifically limited, but insoluble sulfur treated with oil is preferable because the generation of bloom during process can be suppressed and dispersibility is superior. There are specifically exemplified those such as CRYSTEX HSOT20 available from Flexsys Chemicals Sdn. Bhd. and Sanfel EX available from Sanshin Chemical Industry Co., Ltd.

Here, the insoluble sulfur is sulfur insoluble in, for example, carbon disulfide and rubbery hydrocarbon, but the insoluble sulfur mentioned in the present invention means high molecular weight sulfur in which a component insoluble in carbon disulfide is at least 80% in particular. Further, it may be also high molecular weight sulfur in which a component insoluble in carbon disulfide is at least 90%.

The compounding amount of sulfur (C) is preferably at least 0.5 part by mass based on 100 parts by mass of the rubber component (A) and more preferably at least 0.6 part by mass in the view point that suitable rubber hardness and steering stability is easily secured. Further, the compounding amount of sulfur (C) is at most 6 parts by mass and preferably at most 5 parts by mass in the view point that strength at break can be suitably secured. Further, when the insoluble sulfur is compounded as sulfur, the compounding amount of sulfur represents the content of sulfur excluding oil in the insoluble sulfur.

The compounding amount of silica (D) is at least 10 parts by mass based on 100 parts by mass of the rubber component (A) and preferably at least 20 parts by mass in the view point that grip performance and strength at break is superior. Further, the compounding amount of silica (D) is at most 100 parts by mass based on 100 parts by mass of the rubber component (A) and preferably at most 90 parts by mass in the view point that low heat build-up property is secured and even if the amount is excessively increased, the improvement of grip performance is not expected any more.

Silica (D) is not specifically limited and silica generally used in the rubber industry can be used. Among these, the nitrogen adsorption specific surface area ($N_2SA$) of silica (D) is preferably at least 40 $m^2/g$ and more preferably at least 45 $m^2/g$. When the nitrogen adsorption specific surface area ($N_2SA$) of silica (D) is less than 40 $m^2/g$, reinforcing property and abrasion resistance tends to be lowered. Further, the nitrogen adsorption specific surface area ($N_2SA$) of silica (D) is preferably at most 250 $m^2/g$ and more preferably at most 240 $m^2/g$. When the nitrogen adsorption specific surface area ($N_2SA$) of silica (D) exceeds 250 $m^2/g$, reinforcing property is not improved above it but processability and rubber viscosity tends to be remarkably deteriorated.

Z115GR ($N_2SA$:112 $m^2/g$) available from Rhodia S. A. is preferably used because reinforcing property and abrasion resistance exhibits adequate effect for being used for a tire for an automobile and processability and dispersibility is also good.

A silane coupling agent is preferably used in combination with silica (D) in the present invention.

The silane coupling agent is not specifically limited, and those having been conventionally compounded in a rubber composition together with silica in the tire industry can be used. Specifically, there are exemplified sulfides such as bis (3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl) trisulfide, bis(2-triethoxysilylethyl)trisulfide, bis(4-triethoxysilylbutyl)trisulfide, bis(3-trimethoxysilylpropyl) trisulfide, bis(2-trimethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. These silane coupling agents may be used alone or at least 2 kinds may be used in combination. Among these, bis(3-triethoxysilylpropyl)tetrasulfide and bis(3-triethoxysilyipropyi)disulfide are preferably used.

When the silane coupling agent is compounded, the compounding amount of the silane coupling agent is preferably at least 5 parts by mass based on 100 parts by mass of silica (D), more preferably at least 6 parts by mass and further preferably at least 8 parts by mass in the view point that processability and heat build-up property is superior. Further, the compounding amount of the silane coupling agent is preferably at most 12 parts by mass based on 100 parts by mass of silica (D) and more preferably at most 10 parts by mass in the view point that when the silane coupling agent is excessively compounded, excessive coupling agent releases sulfur and the rubber is excessively cured; therefore strength at break is lowered and cost is heightened.

Further, carbon black (E) is preferably further compounded in the rubber composition for tread of the present invention.

The compounding amount of carbon black (E) is preferably at least 2 parts by mass based on 100 parts by mass of the rubber component (A) and more preferably at least 5 parts by mass in the view point that the deterioration of a rubber by ultraviolet rays is prevented. Further, the compounding amount of carbon black (E) is preferably at most 50 parts by mass based on 100 parts by mass of the rubber component (A)

and more preferably at most 45 parts by mass in the view point that silica superior in grip performance and low heat build-up property is adequately compounded and the processability of carbon black is good.

Carbon black (E) is not specifically limited and carbon black generally used in the tire industry can be used. In particular, the nitrogen adsorption specific surface area ($N_2SA$) of carbon black (E) is preferably at least 40 $m^2/g$ and more preferably at least 45 $m^2/g$. When the nitrogen adsorption specific surface area ($N_2SA$) of carbon black (E) is less than 40 $m^2/g$, reinforcing property and abrasion resistance tends to be remarkably deteriorated. Further, the nitrogen adsorption specific surface area of carbon black (E) is preferably at most 300 $m^2/g$ and more preferably at most 280 $m^2/g$. When the nitrogen adsorption specific surface area of carbon black (E) exceeds 300 $m^2/g$, dispersibility is bad and reinforcing property and abrasion resistance tends to be lowered all the more.

A rubber composition with high hardness (Hs) can be obtained by further compounding the citraconic imide compound (F) in addition to the alkylphenol-sulfur chloride condensate (B).

As the citraconic imide compound (F), bis citraconic imides are preferable because they are thermally stable and dispersibility in a rubber is superior. There are specifically exemplified 1,2-biscitraconic imide methylbenzene, 1,3-biscitraconic imide methylbenzene, 1,4-biscitraconic imide methylbenzene, 1,6-biscitraconic imide methylbenzene, 2,3-biscitraconic imide methyltoluene, 2,4-biscitraconic imide methyltoluene, 2,5-biscitraconic imide methyltoluene, 2,6-biscitraconic imide methyltoluene, 1,2-biscitraconic imide ethylbenzene, 1,3-biscitraconic imide ethylbenzene, 1,4-biscitraconic imide ethylbenzene, 1,6-biscitraconic imide ethylbenzene, 2,3-biscitraconic imide ethyltoluene, 2,4-biscitraconic imide ethyltoluene, 2,5-biscitraconic imide ethyltoluene and 2,6-biscitraconic imide ethyltoluene. Among these, 1,3-biscitraconic imide methylbenzene is preferable because it is thermally stable in particular, it is superior in dispersibility in a rubber in particular and a rubber composition with high hardness (Hs) (reversion control) can be obtained and bond between polymers formed is thermally stable.

1,3-Biscitraconic imide methylbenzene is a compound represented by the following chemical formula.

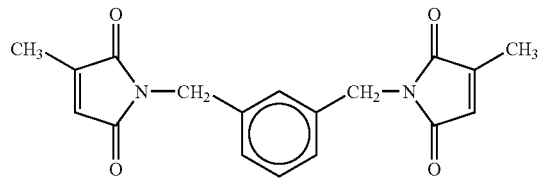

The compounding amount of the citraconic imide compound (F) is preferably at least 0.1 part by mass based on 100 parts by mass of the rubber component (A) and more preferably at least 0.2 part by mass. When the compounding amount of the citraconic imide compound (F) is less than 0.1 part by mass, it is insufficient for the appropriate amount of sulfur and polysulfide bond tends to be mainly formed. Further, the compounding amount of the citraconic imide compound (F) is preferably at most 5 parts by mass based on 100 parts by mass of the rubber component (A) and more preferably at most 4 parts by mass. When the compounding amount of the citraconic imide compound (F) exceeds 5 parts by mass, it is much more than the appropriate amount of sulfur and the bond number of disulfide formed tends to have peaked.

Generally, when the content of a filler in the rubber composition is generally reduced, tan δ is lessened and rolling resistance becomes good, but complex elastic modulus (E*) is decreased and steering stability is lowered. At least one compound selected from a group comprising a modified resorcinol resin, a modified cresol resin and a modified phenol resin is preferably further compounded in order to prepare the rubber composition for tread in which tan δ is little, rolling resistance is good, complex elastic modulus (E*) is not reduced and steering stability is good, in the rubber composition of the present invention.

The phenol resin is not specifically limited but is obtained by reacting phenol with aldehydes such as formaldehyde, acetaldehyde and furfural by acid or alkali catalyst. The modified phenol resin includes, for example, a phenol resin modified with at least one kind selected from a group comprising cashew oil, toll oil, linseed oil, various animal oil and plant oil, unsaturated aliphatic acid, rosin, alkylbenzene resin, aniline and melamine.

In particular, a phenol resin modified with cashew oil is preferable as the modified phenol resin because the complex elastic modulus (E*) is improved.

The resorcinol condensate means a compound represented by the formula below:

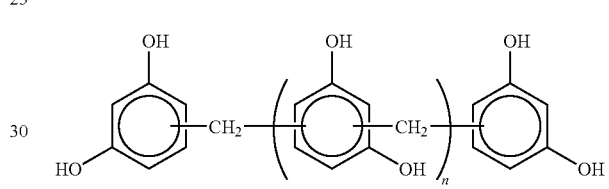

The modified resorcinol condensate includes those obtained by alkylating the resorcinol condensate in like manner as the formula below. In the formula, n is an integer.

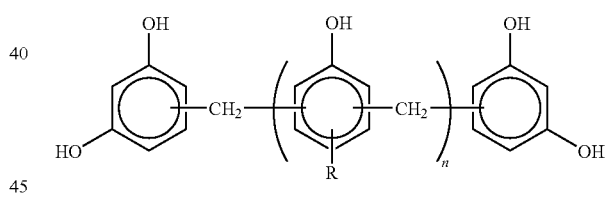

Example of the modified resorcinol condensate includes SUMIKANOL 620 available from Sumitomo Chemical Co., Ltd., Penacolite Resin (1319S available from INDSPEC Chemical Corporation) as a resorcinol-formalin reaction product and RSM (a mixture of about 60% by mass of resorcinol and about 40% by mass of stearic acid). Among these, SUMIKANOL 620 in which R is an octyl group is preferable because it is superior in stability by aging change.

A cresol resin means a compound represented by the following formula. Wherein n is an integer of at least 1.

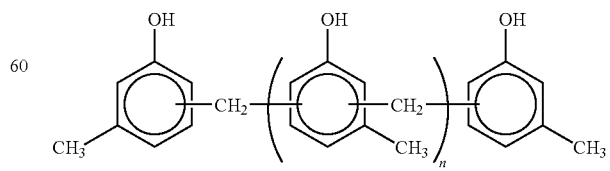

Since the cresol resin has a chemical softening point of near 100° C. (92 to 107° C.), it is solid at normal temperature.

Since the cresol resin is liquid at kneading a rubber and it is easily dispersed, a metacresol resin is most preferable.

The modified cresol resin includes those obtained by modifying a methyl group at the terminal of the above cresol resin to a hydroxyl group and those obtained by alkylating the 5 portion of the repeating unit of the cresol resin.

The content of the at least one compound selected from a group comprising the modified resorcinol resin, the modified cresol resin and the modified phenol resin is preferably at least 0.5 part by mass based on 100 parts by mass of the rubber component, more preferably at least 1.0 part by mass and further preferably at least 1.5 parts by mass. When the content of the at least one compound selected from a group comprising the modified resorcinol resin, the modified cresol resin and the modified phenol resin is less than 0.5 part by mass, the crosslinking density of the resin is not adequate in comparison with the crosslinking density of sulfur and hardness is lowered. Further, the content of the at least one compound selected from a group comprising the modified resorcinol resin, the modified cresol resin and the modified phenol resin is preferably at most 3.0 parts by mass, more preferably at most 2.5 parts by mass and further preferably at most 2.0 parts by mass. When the content of the at least one compound selected from a group comprising the modified resorcinol resin, the modified cresol resin and the modified phenol resin exceeds 3 parts by mass, the crosslinking density of the resin is too large in comparison with the crosslinking density of sulfur; therefore low heat build-up property is lowered.

Further, when the at least one compound selected from a group comprising the modified resorcinol resin, the modified cresol resin and the modified phenol resin aforementioned is included, at least one compound selected from a group comprising hexamethylenetetramine (HMT), hexamethoxymethylolmelamine (HMMM) and hexamethylolmelaminepentamethyl ether (HMMPME) is preferably further included in the view point that strength at break is improved and in the view point that the hardness of the rubber composition is improved. Among these, HMT is preferable because methylene (formaldehyde) is generated (it is not generated during process) during the vulcanization of a tire.

The content of the at least one compound selected from a group comprising HMT, HMMM and HMMPME is preferably at least 0.1 part by mass based on 100 parts by mass of the rubber component, more preferably at least 0.2 part by mass and further preferably at least 0.3 part by mass. When the content of the compound is less than 0.1 part by mass, the generation of methylene is insufficient and the crosslinking density of the modified resorcinol resin, the modified cresol resin and the modified phenol resin tends to be not adequate. Further, the content of the at least one compound selected from a group comprising HMT, HMMM and HMMPME is preferably at most 5 parts by mass, more preferably at most 4 parts by mass and further preferably at most 3 parts by mass. When the content of the compound exceeds 5 parts by mass, strength at break tends to be lowered by deterioration caused by thermal oxidation.

In the rubber composition of the present invention, there can be suitably compounded compounding agents conventionally used in the rubber industry such as, for example, oil, stearic acid, an antioxidant, wax, zinc oxide, a vulcanizing agent other than sulfur and various vulcanization accelerators, in addition to the above rubber component (A), alkylphenol-sulfur chloride condensate (B), sulfur (C), silica (D), silane coupling agent, carbon black (E), citraconic imide compound (F), modified resorcinol resin, modified cresol resin and modified phenol resin, HMT, HMMM and HMMPME.

The compounding amounts of these other compounding agents are within a range not damaging the effect of the present invention by the rubber component (A), alkylphenol-sulfur chloride condensate (B), sulfur (C) and silica (D).

The vulcanization accelerator includes sulfenamide, thiazole, thiuram and guanidine vulcanization accelerators.

These vulcanization accelerators may be used alone and at least two kinds may be used in combination.

The rubber composition of the present invention is prepared by a general method. Specifically, the rubber composition of the present invention can be prepared by kneading the rubber component (A), silica (D) and other compounding agents if necessary, with a Banbury mixer, a kneader and an open roll and then, compounding the alkylphenol-sulfur chloride condensate (B), sulfur (C) and vulcanization accelerators to carry out final compounding and carrying out vulcanization.

The rubber composition of the present invention is used as the tread of a tire because both of the grip performance and abrasion resistance and low heat build-up property (low tan δ) are satisfied.

Further, it is preferable that the tread is prepared as a double layered structure using the rubber composition for cap tread and the rubber composition for base tread in the view point that rolling resistance can be reduced without lowering steering stability.

The tire of the present invention is produced by a usual method using the rubber composition of the present invention. Specifically, the rubber composition of the present invention compounding the above compounding agents, if necessary, is extruded and processed in matching with the form of the tread of a tire at unvulcanization stage and molded on a tire molding machine by a usual method; thereby an unvulcanized tire is formed. The unvulcanized tire is heated and pressurized in a vulcanizer to be able to obtain a tire.

EXAMPLES

The present invention is specifically illustrated based on Examples, but the present invention is not limited only to these.

Then, various chemicals used in Examples and Comparative Examples are illustrated.

Natural rubber (NR1): RSS#3

Natural rubber (NR2): TSR20

Modified styrene-butadiene rubber (modified SBR): HPR 340 (modified S-SBR: bonded styrene amount: 10% by mass, coupling was carried out with alkoxyl silane and it was introduced at terminal) manufactured by JSR Corporation Tin-modified butadiene rubber (modified BR): BR1250 (Polymerization by lithium initiator, content of tin atom: 250 ppm, Vinyl amount: 10 to 13% by mass, Mw/Mn: 1.5) manufactured by ZEON Corporation.

Butadiene rubber other than modified BR (BR): BR150B manufactured by Ube Industries Ltd.

Butadiene rubber including 1,2-syndiotactic crystals (SPB-including BR): VCR 617 (Content of syndiotactic crystals: 17% by mass) manufactured by Ube Industries Ltd.

Butadiene rubber modified with an ethoxysilane (S-modified BR): S-modified BR (Terminal structure of molecular chain: butadiene rubber modified with an ethoxysilyl group; the formula, $$C_2H_5O-\underset{\underset{OC_2H_5}{|}}{\overset{\overset{OC_2H_5}{|}}{Si}}-(CH_2)_3-N\overset{H}{\underset{H}{\diagdown}}$$

and vinyl content: 15%) manufactured by Sumitomo Chemical Co., Ltd.

Styrene-butadiene rubber modified with an ethoxysilane (S-modified SBR): SE0190 (Terminal structure of molecular chain: styrene-butadiene rubber modified with an ethoxysilyl group; the formula, $$C_2H_5O-\underset{\underset{OC_2H_5}{|}}{\overset{\overset{OC_2H_5}{|}}{Si}}-(CH_2)_3-N\overset{H}{\underset{H}{\diagdown}}$$

styrene content: 25% and vinyl content: 59%) manufactured by Sumitomo Chemical Co., Ltd.

Silica: Z115GR ($N_2SA$: 112 $m^2/g$) available from RHODIA S.A.

Silane coupling agent 1: Si69 (bis(3-triethoxysilylpropyl) tetrasufide) available from Evonik Degussa GmbH Silane coupling agent 2: Si75 (bis(3-triethoxysilylpropyl) disulfide) available from Evonik Degussa GmbH Aromatic oil: PROCESS X-140 available from Japan Energy Co., Ltd.

Carbon black N330: SHOWBLACK N330 ($N_2SA$: 79 $m^2/g$) available from CABOT JAPAN K.K.

Carbon black N550: SHOWBLACK N550 ($N_2SA$: 42 $m^2/g$) available from CABOT JAPAN K.K.

Antioxidant: NOCRAC 6C (N-(1,3-dimethylbutyl)-N'-phenyl-p-phenylenediamine) available from OUCHI SHINKO CHEMICAL INDUSTRIAL CO., LTD.

Wax: SUNNOC WAX available from OUCHI SHINKO CHEMICAL INDUSTRIAL CO., LTD.

Stearic acid: TSUBAKI available from NOF Corporation

Zinc oxide: GINREI R available from Toho Zinc Co., Ltd.

Sulfur (including 20% of oil): CRYSTEX HSOT20 (Insoluble sulfur including 80% by mass of sulfur and 20% by mass of oil. Among sulfur, insoluble sulfur is at least 90% and soluble sulfur is at most 10%) available from Flexsys Chemicals Sdn. Bhd.

Sulfur Powder (including 5% of oil): Sulfur Powder treated with 5% of oil (Soluble sulfur including 5% by mass of oil) available from TSURUMI CHEMICAL INDUSTRY CO., LTD.

Vulcanization accelerator CZ: NOCCELER CZ (N-cyclohexyl-2-benzothiazylsulfenamide) available from OUCHI SHINKO CHEMICAL INDUSTRIAL CO., LTD.

Vulcanization accelerator DPG: NOCCELER D (1,3-diphenylguanidine) available from OUCHI SHINKO CHEMICAL INDUSTRIAL CO., LTD.

Vulcanization accelerator TBBS: NOCCELER NS (N-tert-butyl-2-benzothia zolyl sulfenamide) available from OUCHI SHINKO CHEMICAL INDUSTRIAL CO., LTD.

Vulcanization accelerator HMT: Hexamethylenebisthiosulfate disodium salt dehydrate: DURALINK HTS available from Flexsys Chemicals Sdn. Bhd.

Vulcanization accelerator TBZTD: Perkacit TBzTD (tetrabenzylthiuram disulfide) available from Flexsys Chemicals Sdn. Bhd V200: TACKROL V200 (Alkylphenol-sulfur chloride condensate, x and y are 2, R: alkyl group of C8H17, and content of sulfur: 24% by mass) available from Taoka Chemical Co., Ltd.

(wherein n is an integer of 0 to 10)

HTS: Sodium 1,6-hexamethylenedithio sulfate dehydrate available from Flexsys Chemicals Sdn. Bhd.

$$Na^+{}^-O_3S\diagdown^S\diagdown(CH_2)_6\diagdown^S\diagdown SO_3{}^-Na^+\cdot 2\,H_2O$$

PK900: PK900 (1,3-bis(citraconic imidemethyl)benzene) available from Flexsys Chemicals Sdn. Bhd.

Modified resorcinol: SUMIKANOL 620 (resorcinol-alkylphenol condensate) available from Sumitomo Chemical Co., Ltd.

(wherein R is an octyl group)

Modified cresol: SUMIKANOL 610 (n=16 to 17 in the chemical formula 1) available from Sumitomo Chemical Co., Ltd.

Phenol resin: Sumilite resin PR12686 available from Sumitomo Bakelite Co.,

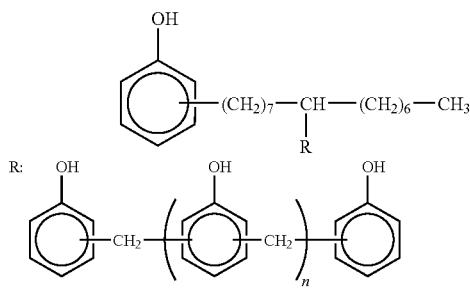

Examples 1 to 13 and Comparative Examples 1 to 9

Various chemicals excluding the alkylphenol-sulfur chloride condensate, sulfur and a vulcanization accelerator were kneaded with a Banbury mixer according to the compounding amounts shown in Tables 1 and 2. The compounding amounts shown in Tables 1 and 2 of the alkylphenol-sulfur chloride condensate, sulfur and a vulcanization accelerator were added to the kneaded product obtained, and the mixture was kneaded with an open roll to obtain uncured rubber compositions. Then, the uncured rubber compositions obtained were vulcanized under the condition of 170° C. for 12 minutes to prepare the rubber sheets for test of Examples 1 to 13 and Comparative Examples 1 to 9 and tests shown below were carried out using the rubber sheets for test obtained.

(Viscoelasticity Test) The complex elastic modulus E* and loss tangent tan δ of the cured rubber compositions at 30° C. was measured under the conditions of an initial stain of 10%, a dynamic strain of 2% and a frequency of 10 Hz, using a viscoelasticity spectrometer manufactured by Iwamoto Seisakusyo K.K. Further, it is indicated that the larger the E* is, the higher the rigidity and the higher the hardness is and the smaller the tan δ is, the more superior the low heat build-up property is.

(Tensile Test)

Tensile test was carried out according to JIS K 6251 "Vulcanized rubber and thermoplastic rubber—Determination method of tensile property", using No. 3 dumbbell type test pieces comprising the above cured rubber compositions and elongation at break EB (%) was measured. It is indicated that the larger the EB is, the more superior the rubber strength is.

Further, the uncured rubber compositions obtained were extruded and molded with an extruder equipped with a fixed shape cap to obtain cap tread shape and base tread shape rubber compositions. Measurements below were carried out for respective test samples. Further, the rubber compositions obtained were laminated on a tire molding machine by a fixed process to prepare tire low covers, these were cured in a mold to prepare tires with air in trial and measurements below were carried out.

(Abrasion Resistance)

Abrasion test was carried out at the conditions of room temperature and a slip rate of 20% using a Lambourn type abrasion tester. The reciprocal number of abrasion quantity was displayed by index referring Comparative Example 1 as 100 (basis). It is indicated that the larger the value is, the more the abrasion resistance is improved.

(Rolling Resistance)

The tan δ was measured at the conditions of a dynamic strain amplitude of 2%, a frequency of 10% and a temperature of 60° C. using a spectrometer manufactured by Ueshima Seisakusyo K.K. The reciprocal numbers of the tan δ values were displayed by indices referring Comparative Example 1 as 100 (basis). It is indicated that the larger the value is, the more the rolling resistance is reduced.

(Steering Stability)

Sensory test was carried out on a test course by a normal vehicle loading the tires, using the tires obtained by the rubber compositions obtained in respective Examples and Comparative Examples. The higher the score is (6 is perfect score), the better the steering stability is.

The evaluation results of the above-mentioned tests are shown in Tables 1 and 2.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | Compounding amount (parts by mass) | | | | | | | | | | | | |
| Modified SBR | 70 | 70 | 70 | 70 | 70 | 70 | 40 | 70 | 70 | 70 | 70 | 70 | 70 |
| NR1 | 30 | 30 | 30 | 30 | 30 | 30 | 60 | 30 | 30 | 30 | — | — | — |
| BR | — | — | — | — | — | — | — | — | — | — | 30 | — | — |
| Modified BR | — | — | — | — | — | — | — | — | — | — | — | 30 | — |
| SPB-including BR | — | — | — | — | — | — | — | — | — | — | — | — | 30 |
| Silica | 45 | 45 | 45 | 45 | 45 | 45 | 45 | 20 | 60 | 45 | 45 | 45 | 45 |
| Aromatic oil | 3 | 3 | 3 | 3 | 3 | 3 | 3 | 3 | 3 | 3 | 3 | 3 | 3 |
| Silane coupling agent 1 | 3.6 | 3.6 | 3.6 | 3.6 | 3.6 | 3.6 | 3.6 | 1.6 | 4.8 | 3.6 | 3.6 | 3.6 | 3.6 |
| Carbon black N330 | 5 | 5 | 5 | 5 | 5 | 5 | 5 | 30 | 5 | 5 | 5 | 5 | 5 |
| Antioxidant 6C | 2 | 2 | 2 | 2 | 2 | 2 | 2 | 2 | 2 | 2 | 2 | 2 | 2 |
| Wax | 1.5 | 1.5 | 1.5 | 1.5 | 1.5 | 1.5 | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 | 2.5 | 2.5 | 2.5 | 2.5 |
| Insoluble sulfur | 2.5 | 3.75 | 5.0 | 6.25 | 3.75 | 3.75 | 2.5 | 2.5 | 2.0 | 1.125 | 2.5 | 2.5 | 2.5 |
| (Content of pure sulfur) | (2.0) | (3.0) | (4.0) | (5.0) | (3.0) | (3.0) | (2.0) | (2.0) | (1.6) | (0.9) | (2.0) | (2.0) | (2.0) |
| Vulcanization accelerator CZ | 1.8 | 1.8 | 1.8 | 1.8 | 1.8 | 1.8 | 1.8 | 1.8 | 1.8 | 1.8 | 1.8 | 1.8 | 1.8 |
| Vulcanization accelerator DPG | 0.6 | 0.6 | 0.6 | 0.6 | 0.6 | 0.6 | 0.6 | 0.6 | 0.6 | 0.6 | 0.6 | 0.6 | 0.6 |
| V200 | 3.0 | 3.0 | 3.0 | 3.0 | 6.0 | 6.0 | 3.0 | 3.0 | 3.0 | 3.0 | 3.0 | 3.0 | 3.0 |

TABLE 1-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| HTS | — | — | — | — | — | — | — | — | — | — | — | — | — |
| PK900 | — | — | — | — | — | 3.0 | — | — | — | — | — | — | — |
| | Evaluation result | | | | | | | | | | | | |
| E*(30° C.) | 4.18 | 4.53 | 5.03 | 5.86 | 5.13 | 5.40 | 3.88 | 4.63 | 4.48 | 3.50 | 4.40 | 4.32 | 4.92 |
| tanδ | 0.105 | 0.092 | 0.078 | 0.070 | 0.077 | 0.070 | 0.118 | 0.119 | 0.117 | 0.115 | 0.107 | 0.090 | 0.110 |
| Elongation at break EB (%) | 365 | 324 | 238 | 215 | 280 | 268 | 490 | 330 | 510 | 520 | 355 | 333 | 301 |
| Abrasion resistance | 102 | 90 | 81 | 65 | 88 | 90 | 100 | 105 | 104 | 112 | 104 | 104 | 100 |
| Rolling resistance | 106 | 107 | 113 | 118 | 113 | 118 | 102 | 102 | 102 | 102 | 105 | 107 | 104 |
| Steering stability | 5 | 6 | 6 | 6 | 6 | 6 | 4 | 6 | 6 | 4 | 6 | 5 | 6 |

TABLE 2

| | Comparative Examples | | | | | | | | |
|---|---|---|---|---|---|---|---|---|---|
| | 1 | 2 | 3 | 4 | 5 | 6 | 7 | 8 | 9 |
| | Compounding amount (parts by mass) | | | | | | | | |
| Modified SBR | 70 | 70 | 70 | 70 | 70 | 70 | 70 | 70 | 70 |
| NR1 | 30 | 30 | 30 | 30 | 30 | 30 | 30 | 30 | 30 |
| BR | — | — | — | — | — | — | — | — | — |
| Modified BR | — | — | — | — | — | — | — | — | — |
| SPB-including BR | — | — | — | — | — | — | — | — | — |
| Silica | 45 | 45 | 45 | 45 | 45 | 45 | 45 | 45 | 45 |
| Aromatic oil | 3 | 3 | 3 | 3 | 3 | 3 | 3 | 3 | 3 |
| Silane coupling agent 1 | 3.6 | 3.6 | 3.6 | 3.6 | 3.6 | 3.6 | 5.4 | 3.6 | 3.6 |
| Carbon black N330 | 5 | 5 | 5 | 5 | 5 | 5 | 5 | 5 | 5 |
| Antioxidant 6C | 2 | 2 | 2 | 2 | 2 | 2 | 2 | 2 | 2 |
| Wax | 1.5 | 1.5 | 1.5 | 1.5 | 1.5 | 1.5 | 1.5 | 1.5 | 1.5 |
| Stearic acid | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 |
| Insoluble sulfur | 2.5 | 3.75 | 5.0 | 6.25 | 3.75 | 3.75 | 3.75 | 8.75 | 3.75 |
| (Content of pure sulfur) | (2.0) | (3.0) | (4.0) | (5.0) | (3.0) | (3.0) | (3.0) | (7.0) | (3.0) |
| Vulcanization accelerator CZ | 1.8 | 1.8 | 1.8 | 1.8 | 1.8 | 1.8 | 1.8 | 1.8 | 2.4 |
| Vulcanization accelerator DPG | 0.6 | 0.6 | 0.6 | 0.6 | 0.6 | 0.6 | 0.6 | 0.6 | — |
| V200 | — | — | — | — | — | — | — | 3.0 | 11 |
| HTS | — | — | — | — | 3.0 | — | — | — | — |
| PK900 | — | — | — | — | — | 3.0 | — | — | — |
| | Evaluation result | | | | | | | | |
| E*(30° C.) | 3.88 | 4.10 | 4.53 | 5.24 | 4.28 | 4.24 | 4.18 | 6.10 | 5.43 |
| tanδ | 0.123 | 0.102 | 0.096 | 0.076 | 0.098 | 0.097 | 0.095 | 0.070 | 0.75 |
| Elongation at break EB (%) | 310 | 260 | 170 | 120 | 250 | 245 | 245 | 120 | 90 |
| Abrasion resistance | 100 | 91 | 80 | 67 | 88 | 89 | 86 | 45 | 70 |
| Rolling resistance | 100 | 104 | 105 | 113 | 105 | 105 | 105 | 117 | 112 |
| Steering stability | 4 | 5 | 6 | 6 | 5 | 5 | 5 | 6 | 6 |

Examples 14 to 46 and Comparative Examples 10 to 28

Various chemicals excluding the alkylphenol-sulfur chloride condensate, sulfur and a vulcanization accelerator were kneaded under the condition of a maximum temperature of 165° C. for 5 minutes with a Banbury mixer according to the compounding amounts shown in Tables 3 to 9. The compounding amounts shown in Tables 3 to 9 of the alkylphenol-sulfur chloride condensate, sulfur and a vulcanization accelerator were added to the kneaded product obtained, and the mixture was kneaded with an open roll under the condition of a maximum temperature of 97° C. for 3 minutes to obtain uncured rubber compositions. Then, the uncured rubber compositions obtained were vulcanized under the condition of 170° C. for 12 minutes to prepare the rubber sheets for test of Examples 14 to 46 and Comparative Examples 10 to 28 and tests were carried out by methods similar as Example 1. Evaluation results are shown in Tables 3 to 9.

TABLE 3

| | Examples | | | |
|---|---|---|---|---|
| | 14 | 15 | 16 | 17 |
| | Compounding amount (parts by mass) | | | |
| Modified SBR | 70 | 70 | 70 | 70 |
| NR 2 | 30 | 30 | 30 | 30 |
| Silica | 45 | 45 | 45 | 45 |
| Carbon black N330 | 5 | 5 | 5 | 5 |
| Silane coupling agent 2 | 3.6 | 3.6 | 3.6 | 3.6 |
| Modified cresol | — | — | 1.5 | 1.5 |
| PK900 | — | — | — | 2 |
| Zinc oxide | 2.5 | 2.5 | 2.5 | 2.5 |
| Stearic acid | 2 | 2 | 2 | 2 |
| Antioxidant 6C | 2 | 2 | 2 | 2 |
| Wax | 1.5 | 1.5 | 1.5 | 1.5 |
| Aromatic oil | 3 | 3 | 3 | 3 |
| Insoluble sulfur (including 20% of oil) | 1.25 | 2.5 | 1.25 | 1.25 |

TABLE 3-continued

|  | Examples | | | |
|---|---|---|---|---|
|  | 14 | 15 | 16 | 17 |
| (Content of pure sulfur) | (1.00) | (2.00) | (1.00) | (1.00) |
| Vulcanization accelerator TBBS | 1.8 | 1.8 | 1.8 | 1.8 |
| Vulcanization accelerator HMT | — | — | 0.45 | 0.45 |
| Zinc methacrylate | — | — | — | — |
| V200 | 6 | 3 | 6 | 6 |
| Evaluation result | | | | |
| E*(30° C.) | 4.14 | 4.05 | 4.36 | 4.62 |
| tanδ | 0.083 | 0.112 | 0.075 | 0.071 |
| Elongation at break EB (%) | 370 | 400 | 420 | 410 |
| Abrasion resistance | 110 | 105 | 117 | 119 |
| Rolling resistance | 111 | 106 | 113 | 116 |
| Steering stability | 5 | 5 | 6 | 6 |

TABLE 4

|  | Examples | | | | | Comparative Examples | | | | |
|---|---|---|---|---|---|---|---|---|---|---|
|  | 18 | 19 | 20 | 21 | 22 | 10 | 11 | 12 | 13 | 14 |
| Compounding amount (parts by mass) | | | | | | | | | | |
| Modified SBR | 20 | 40 | 60 | 20 | 20 | 20 | 40 | 20 | 20 | 85 |
| Modified BR | 20 | 20 | 20 | 20 | 20 | 20 | — | 20 | 20 | — |
| NR2 | 60 | 40 | 20 | 60 | 60 | 60 | 60 | 60 | 60 | 15 |
| Silica | 30 | 30 | 30 | 15 | 45 | 30 | 30 | 5 | 55 | 30 |
| Carbon black N550 | 5 | 5 | 5 | 20 | 5 | 5 | 5 | 30 | 5 | 5 |
| Silane coupling agent 2 | 2.4 | 2.4 | 2.4 | 2.4 | 3.6 | 2.4 | 2.4 | — | — | 2.4 |
| Zinc oxide | 2.5 | 2.5 | 2.5 | 2.5 | 2.5 | 2.5 | 2.5 | 2.5 | 2.5 | 2.5 |
| Stearic acid | 2 | 2 | 2 | 2 | 2 | 2 | 2 | 2 | 2 | 2 |
| Antioxidant 6C | 2 | 2 | 2 | 2 | 2 | 2 | 2 | 2 | 2 | 2 |
| Wax | 1.5 | 1.5 | 1.5 | 1.5 | 1.5 | 1.5 | 1.5 | 1.5 | 1.5 | 1.5 |
| Aromatic oil | 3 | 3 | 3 | 3 | 3 | 3 | 3 | 3 | 3 | 3 |
| Insoluble sulfur (including 20% of oil) | 3.00 | 3.00 | 3.00 | 3.00 | 3.00 | 3.00 | 3.00 | 3.00 | 3.00 | 3.00 |
| (Content of pure sulfur) | (2.40) | (2.40) | (2.40) | (2.40) | (2.40) | (2.40) | (2.40) | (2.40) | (2.40) | (2.40) |
| Vulcanization accelerator TBBS | 1.8 | 1.8 | 1.8 | 1.8 | 1.8 | 1.8 | 1.8 | 1.8 | 1.8 | 1.8 |
| Vulcanization accelerator DPG | — | — | — | — | — | 0.6 | 0.6 | 0.6 | 0.6 | 0.6 |
| V200 | 2 | 2 | 2 | 2 | 2 | — | — | — | — | 2 |
| Evaluation result | | | | | | | | | | |
| E*(30° C.) | 3.90 | 4.10 | 4.30 | 4.40 | 3.65 | 3.80 | 3.95 | 4.50 | 6.50 | 4.70 |
| tanδ | 0.073 | 0.07 | 0.073 | 0.076 | 0.11 | 0.112 | 0.117 | 0.128 | 0.165 | 0.095 |
| Elongation at break EB (%) | 350 | 270 | 240 | 270 | 410 | 380 | 350 | 230 | 200 | 220 |
| Abrasion resistance | 86 | 89 | 91 | 80 | 95 | 85 | 80 | 71 | 105 | 90 |
| Rolling resistance | 115 | 116 | 115 | 116 | 105 | 102 | 102 | 98 | 81 | 105 |
| Steering stability | 4 | 5 | 5 | 6 | 4 | 4 | 4 | 6 | 6 | 6 |

TABLE 5

|  | Examples | | | | Comparative Examples | | | |
|---|---|---|---|---|---|---|---|---|
|  | 23 | 24 | 25 | 26 | 15 | 16 | 17 | 18 |
| Compounding amount (parts by mass) | | | | | | | | |
| Modified SBR | 70 | 70 | 70 | 70 | 70 | 70 | 10 | 90 |
| S-modified SBR | — | — | — | — | — | — | — | — |
| NR2 | 30 | 30 | — | 30 | 30 | 30 | 90 | 10 |
| BR | — | — | 30 | — | — | — | — | — |
| Silica | 35 | 35 | 35 | 35 | 35 | 45 | 35 | 35 |
| Carbon black N330 | 2 | 2 | 2 | 2 | 2 | 2 | 2 | 2 |
| Silane coupling agent 2 | 2.8 | 2.8 | 2.8 | 2.8 | 2.8 | 2.8 | 2.8 | 2.8 |
| Modified resorcinol | 1 | — | 1 | — | — | — | 1 | 1 |
| Modified cresol | — | 1 | — | — | — | — | — | — |
| Zinc oxide | 2.5 | 2.5 | 2.5 | 2.5 | 2.5 | 2.5 | 2.5 | 2.5 |
| Stearic acid | 2 | 2 | 2 | 2 | 2 | 2 | 2 | 2 |
| Antioxidant 6C | 2 | 2 | 2 | 2 | 2 | 2 | 2 | 2 |
| Wax | 1.5 | 1.5 | 1.5 | 1.5 | 1.5 | 1.5 | 1.5 | 1.5 |
| Aromatic oil | 3 | 3 | 3 | 3 | 3 | 3 | 3 | 3 |
| Insoluble sulfur (including 5% of oil) | 1.46 | 1.46 | 1.46 | 1.46 | 2.1 | 2.1 | 1.46 | 1.46 |
| (Content of pure sulfur) | (1.39) | (1.39) | (1.39) | (1.39) | (2.00) | (2.00) | (1.39) | (1.39) |
| Vulcanization accelerator TBBS | 1.8 | 1.8 | 1.8 | 1.8 | 1.8 | 1.8 | 1.8 | 1.8 |
| Vulcanization accelerator DPG | — | — | — | 0.6 | 0.6 | — | — | — |
| Vulcanization accelerator HMT | 0.3 | 0.3 | 0.3 | — | — | — | 0.3 | 0.3 |

TABLE 5-continued

|  | Examples | | | | Comparative Examples | | | |
| --- | --- | --- | --- | --- | --- | --- | --- | --- |
|  | 23 | 24 | 25 | 26 | 15 | 16 | 17 | 18 |
| V200 | 6 | 6 | 6 | 6 | — | — | 6 | 6 |
| Evaluation result | | | | | | | | |
| E*(30° C.) | 4.2 | 4.4 | 4.3 | 3.9 | 3.8 | 4.4 | 3.8 | 4.7 |
| tanδ | 0.084 | 0.087 | 0.086 | 0.083 | 0.11 | 0.144 | 0.152 | 0.077 |
| Elongation at break EB (%) | 300 | 350 | 270 | 300 | 400 | 410 | 600 | 230 |
| Abrasion resistance | 100 | 100 | 110 | 100 | 100 | 100 | 65 | 97 |
| Rolling resistance | 111 | 112 | 111 | 111 | 105 | 96 | 90 | 113 |
| Steering stability | 6 | 6 | 6 | 5 | 4 | 6 | 4 | 6 |

TABLE 6

|  | Examples | | | | | |
| --- | --- | --- | --- | --- | --- | --- |
|  | 27 | 28 | 29 | 30 | 31 | 32 |
| Compounding amount (parts by mass) | | | | | | |
| Modified SBR | 30 | 50 | 50 | 50 | 70 | 70 |
| Modified BR | — | — | 20 | — | — | — |
| S-modified BR | — | — | — | 20 | — | — |
| NR2 | 70 | 50 | 30 | 30 | — | 30 |
| SPB-including BR | — | — | — | — | 30 | — |
| Silica | 35 | 35 | 35 | 35 | 35 | 35 |
| Carbon black N330 | 2 | 2 | 2 | 2 | 2 | 2 |
| Silane coupling agent 2 | 2.8 | 2.8 | 2.8 | 2.8 | 2.8 | 2.8 |
| Modified resorcinol | 1 | 1 | 1 | 1 | 1 | 2 |
| Zinc oxide | 2.5 | 2.5 | 2.5 | 2.5 | 2.5 | 2.5 |
| Stearic acid | 2 | 2 | 2 | 2 | 2 | 2 |
| Antioxidant 6C | 2 | 2 | 2 | 2 | 2 | 2 |
| Wax | 1.5 | 1.5 | 1.5 | 1.5 | 1.5 | 1.5 |
| Aromatic oil | 3 | 3 | 3 | 3 | 3 | 3 |
| Insoluble sulfur (including 5% of oil) | 1.46 | 1.46 | 1.46 | 1.46 | 1.46 | 1.46 |
| (Content of pure sulfur) | (1.39) | (1.39) | (1.39) | (1.39) | (1.39) | (1.39) |
| Vulcanization accelerator TBBS | 1.8 | 1.8 | 1.8 | 1.8 | 1.8 | 1.8 |
| Vulcanization accelerator DPG | — | — | — | — | — | — |
| Vulcanization accelerator HMT | 0.3 | 0.3 | 0.3 | 0.3 | 0.3 | 0.6 |
| V200 | 6 | 6 | 6 | 6 | 6 | 6 |
| Evaluation result | | | | | | |
| E*(30° C.) | 4.0 | 4.4 | 4.1 | 4.3 | 4.7 | 4.6 |
| tanδ | 0.104 | 0.09 | 0.082 | 0.08 | 0.102 | 0.088 |
| Elongation at break EB (%) | 450 | 420 | 290 | 300 | 260 | 280 |
| Abrasion resistance | 80 | 85 | 99 | 98 | 88 | 97 |
| Rolling resistance | 106 | 105 | 110 | 110 | 105 | 111 |
| Steering stability | 5 | 6 | 5 | 6 | 6 | 6 |

TABLE 7

|  | Examples | | | | | Comparative Examples | | |
| --- | --- | --- | --- | --- | --- | --- | --- | --- |
|  | 33 | 34 | 35 | 36 | 37 | 19 | 20 | 21 |
| Compounding amount (parts by mass) | | | | | | | | |
| Modified SBR | 70 | 70 | 70 | 70 | 70 | 70 | 70 | 70 |
| NR2 | 30 | 30 | 30 | 30 | 30 | 30 | 30 | 30 |
| Silica | 38 | 38 | 38 | 38 | 43 | 38 | 38 | 38 |
| Carbon black N330 | 2 | 2 | 2 | 2 | 2 | 2 | 2 | 2 |
| Silane coupling agent 2 | 3.04 | 3.04 | 3.04 | 3.04 | 3.6 | 3.04 | 3.04 | 3.04 |
| Modified resorcinol | 1.5 | — | — | — | — | — | 1.5 | — |
| Modified cresol | — | 1.5 | — | — | — | — | — | 1.5 |
| Modified phenol resin | — | — | 1.5 | — | — | — | — | — |
| Zinc oxide | 2.5 | 2.5 | 2.5 | 2.5 | 2.5 | 2.5 | 2.5 | 2.5 |
| Stearic acid | 2 | 2 | 2 | 2 | 2 | 2 | 2 | 2 |
| Antioxidant 6C | 2 | 2 | 2 | 2 | 2 | 2 | 2 | 2 |
| Wax | 1.5 | 1.5 | 1.5 | 1.5 | 1.5 | 1.5 | 1.5 | 1.5 |
| Aromatic oil | 3 | 3 | 3 | 3 | 3 | 3 | 3 | 3 |

TABLE 7-continued

|  | Examples | | | | | Comparative Examples | | |
| --- | --- | --- | --- | --- | --- | --- | --- | --- |
|  | 33 | 34 | 35 | 36 | 37 | 19 | 20 | 21 |
| Insoluble sulfur (including 5% of oil) | 1.46 | 1.46 | 1.46 | 2.1 | 2.1 | 1.46 | 1.46 | 1.46 |
| (Content of pure sulfur) | (1.39) | (1.39) | (1.39) | (2.00) | (2.00) | (1.39) | (1.39) | (1.39) |
| Vulcanization accelerator TBBS | 1.8 | 1.8 | 1.8 | 1.8 | 1.8 | 1.8 | 1.8 | 1.8 |
| Vulcanization accelerator DPG | — | — | — | — | — | 1.2 | 1.2 | 1.2 |
| Vulcanization accelerator HMT | 0.45 | 0.45 | 0.15 | — | — | — | 0.45 | 0.45 |
| V200 | 6 | 6 | 6 | 6 | 6 | — | — | — |
|  | Evaluation result | | | | | | | |
| E*(30° C.) | 3.7 | 3.8 | 3.7 | 3.8 | 4.4 | 3.0 | 3.2 | 3.3 |
| tanδ | 0.087 | 0.088 | 0.092 | 0.093 | 0.112 | 0.11 | 0.114 | 0.115 |
| Elongation at break EB (%) | 380 | 390 | 400 | 400 | 390 | 490 | 510 | 3520 |
| Steering stability | 5 | 5 | 5 | 5 | 6 | 3 | 3 | 3 |

TABLE 8

|  | Examples | | | | | | | Comparative Examples | | |
| --- | --- | --- | --- | --- | --- | --- | --- | --- | --- | --- |
|  | 38 | 39 | 40 | 41 | 42 | 43 | 44 | 22 | 23 | 24 |
|  | Compounding amount (parts by mass) | | | | | | | | | |
| Modified SBR | 70 | 70 | 70 | 70 | 70 | 70 | 70 | 70 | 70 | 70 |
| NR2 | 30 | 30 | 30 | 30 | 30 | 30 | 30 | 30 | 30 | 30 |
| Silica | 40 | 40 | 40 | 35 | 35 | 40 | 40 | 45 | 40 | 45 |
| Carbon black N330 | 2 | 2 | 2 | 2 | 2 | 2 | 2 | 2 | 2 | 2 |
| Silane coupling agent 2 | 3.2 | 3.2 | 3.2 | 2.8 | 2.8 | 3.2 | 3.2 | 3.6 | 3.2 | 3.6 |
| Modified cresol | — | — | — | 1.5 | 1.5 | — | — | — | 1.5 | — |
| Zinc oxide | 2.5 | 2.5 | 2.5 | 2.5 | 2.5 | 2.5 | 2.5 | 2.5 | 2.5 | 2.5 |
| Stearic acid | 2 | 2 | 2 | 2 | 2 | 2 | 2 | 2 | 2 | 2 |
| Antioxidant 6C | 2 | 2 | 2 | 2 | 2 | 2 | 2 | 2 | 2 | 2 |
| Wax | 1.5 | 1.5 | 1.5 | 1.5 | 1.5 | 1.5 | 1.5 | 1.5 | 1.5 | 1.5 |
| Aromatic oil | 5 | 5 | 5 | 5 | 5 | 5 | 5 | 5 | 5 | 5 |
| Insoluble sulfur (including 5% of oil) | 1.47 | 1.47 | 1.47 | 1.05 | 1.47 | 1.47 | 1.47 | 1.47 | 1.47 | 1.47 |
| (Content of pure sulfur) | (1.40) | (1.40) | (1.40) | (6.70) | (1.40) | (1.40) | (1.40) | (1.40) | (1.40) | (1.40) |
| Vulcanization accelerator TBBS | 1.8 | 1.8 | 1.8 | 1.8 | 1.8 | 1.8 | 1.8 | 1.8 | 1.8 | 1.8 |
| Vulcanization accelerator DPG | 0.45 | — | — | — | — | 1.1 | 1.1 | 1.1 | 1.1 | 2.2 |
| Vulcanization accelerator HMT | — | 0.9 | — | 0.45 | 0.45 | — | — | — | 0.45 | — |
| Vulcanization accelerator TBZTD | — | — | 0.25 | — | — | — | — | — | — | — |
| V200 | 6 | 6 | 6 | 6 | 3 | 3 | 6 | — | — | — |
|  | Evaluation result | | | | | | | | | |
| E*(30° C.) | 4.1 | 4.0 | 4.2 | 3.9 | 3.6 | 3.3 | 3.8 | 3.8 | 3.9 | 3.6 |
| tanδ | 0.084 | 0.081 | 0.080 | 0.088 | 0.089 | 0.112 | 0.105 | 0.130 | 0.122 | 0.135 |
| Elongation at break EB (%) | 300 | 340 | 320 | 410 | 360 | 300 | 270 | 260 | 320 | 220 |
| Steering stability | 6 | 6 | 6 | 6 | 5 | 4 | 5 | 5 | 6 | 5 |

TABLE 9

|  | Examples | | Comparative Examples | | | |
| --- | --- | --- | --- | --- | --- | --- |
|  | 45 | 46 | 25 | 26 | 27 | 28 |
|  | Compounding amount (parts by mass) | | | | | |
| Modified SBR | 70 | 70 | 70 | 70 | 70 | 70 |
| NR2 | 30 | 30 | 30 | 30 | 30 | 30 |
| Silica | 40 | 35 | 45 | 45 | 45 | 45 |
| Carbon black N330 | 2 | 2 | 2 | 2 | 2 | 2 |
| Silane coupling agent 2 | 3.2 | 2.8 | 3.6 | 3.6 | 3.6 | 3.6 |
| Modified phenol resin | — | 1.5 | — | — | — | — |
| Zinc oxide | 2.5 | 2.5 | 2.5 | 2.5 | 2.5 | 2.5 |
| Stearic acid | 2 | 2 | 2 | 2 | 2 | 2 |
| Antioxidant 6C | 2 | 2 | 2 | 2 | 2 | 2 |
| Wax | 1.5 | 1.5 | 1.5 | 1.5 | 1.5 | 1.5 |
| Aromatic oil | 5 | 5 | 5 | 5 | 5 | 5 |
| Insoluble sulfur (including 5% of oil) | 1.47 | 1.05 | 1.89 | 1.47 | 1.47 | 1.47 |
| (Content of pure sulfur) | (1.40) | (1.00) | (1.80) | (1.40) | (1.40) | (1.40) |

TABLE 9-continued

|  | Examples | | Comparative Examples | | | |
| --- | --- | --- | --- | --- | --- | --- |
|  | 45 | 46 | 25 | 26 | 27 | 28 |
| Vulcanization accelerator TBBS | 1.8 | 1.8 | 1.8 | 2.6 | 1.8 | 1.8 |
| Vulcanization accelerator DPG | — | — | 1.1 | 1.1 | — | — |
| Vulcanization accelerator HMT | — | 0.45 | — | — | — | 3.5 |
| Vulcanization accelerator TBZTD | — | — | — | — | 0.25 | — |
| V200 | 6 | 6 | — | — | — | — |
| Evaluation result | | | | | | |
| E*(30° C.) | 3.4 | 3.7 | 3.9 | 3.7 | 3.9 | 4.4 |
| tanδ | 0.090 | 0.094 | 0.129 | 0.124 | 0.122 | 0.138 |
| Elongation at break EB (%) | 380 | 380 | 210 | 230 | 250 | 180 |
| Steering stability | 5 | 5 | 6 | 5 | 6 | 6 |

INDUSTRIAL APPLICABILITY

According to the present invention, there can be provided a rubber composition for tread satisfying both of the low heat build-up property and strength at break by comprising the specific amounts of the specific rubber component (A), the specific alkylphenol-sulfur chloride condensate (B), sulfur (C) and silica (D), and a tire having tread using thereof.

The invention claimed is:

1. A rubber composition for tread comprising
0.5 to 10 parts by mass of (B) an alkylphenol-sulfur chloride condensate indicated by the formula (B1):

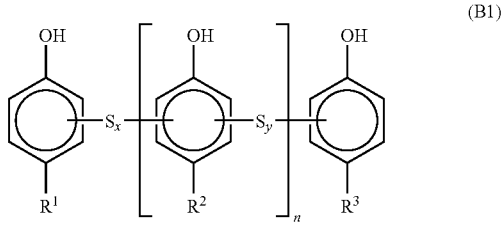

(B1)

wherein $R^1$ to $R^3$ are octyl groups; x and y are same or different, and either is an integer of 2 to 4; n is an integer of 0 to 10,
0.5 to 6 parts by mass of (C) sulfur,
10 to 100 parts by mass of (D) silica, and
5 to 12 parts by mass of at least one silane coupling agent selected from the group consisting of a bis(3-triethoxysilylpropyl)disulfide and a silane coupling agent of mercapto series,
based on 100 parts by mass of (A) a rubber component comprising
20 to 80% by mass of a modified styrene-butadiene rubber having an alkoxysilyl group at terminal and/or a butadiene rubber having an ethoxysilyl group at terminal and
20 to 80% by mass of at least one diene rubber selected from the group consisting of a natural rubber, an isoprene rubber, a butadiene rubber, a tin-modified butadiene rubber and a polybutadiene rubber comprising 1,2-syndiotactic crystals.

2. The rubber composition for tread according to claim 1, further comprising 2 to 50 parts by mass of (E) carbon black based on 100 parts by mass of the rubber component (A).

3. The rubber composition for tread according to claim 1, further comprising 0.1 to 5 parts by mass of (F) a citraconic imide compound based on 100 parts by mass of the rubber component (A).

4. A tire having tread comprising the rubber composition for tread according to claim 1.

5. The rubber composition for tread according to claim 1, wherein the rubber component (A) comprises:
20 to 80% by mass of a modified styrene-butadiene rubber having an alkoxysilyl group at terminal and a butadiene rubber having an ethoxysilyl group at terminal and
20 to 80% by mass of at least one diene rubber selected from the group consisting of a natural rubber, an isoprene rubber, a butadiene rubber, a tin-modified butadiene rubber and a polybutadiene rubber comprising 1,2-syndiotactic crystals.

* * * * *